United States Patent

[11] 3,579,225

[72] Inventor Robert John Clark
Dorion, Quebec, Canada
[21] Appl. No. 866,552
[22] Filed Oct. 15, 1969
[45] Patented May 18, 1971
[73] Assignee RCA Corporation

[54] LIGHT PROBE CIRCUIT FOR PERSISTENT SCREEN DISPLAY SYSTEM
8 Claims, 8 Drawing Figs.

[52] U.S. Cl. ............................................ 340/324A,
340/173CR
[51] Int. Cl. ............................................ G06f 3/14
[50] Field of Search .......................................... 340/324
(A), 173 (CRT), (LT)

[56] References Cited
UNITED STATES PATENTS
3,189,889  6/1965  Bridgett ........................ 340/324A
3,440,638  4/1969  Valkenburg ................... 340/324A Primary Examiner—John W. Caldwell
Assistant Examiner—David L. Trafton
Attorney—H. Christoffersen ABSTRACT: The light sensed by a light "probe" or "pen" during each field displayed on a persistent screen causes a signal to be stored for a duration which is a fraction of the field time. The placing of the probe in a light sensing position causes a second signal of a duration at least equal to one field time to be stored and which starts at a time after the pen is placed in its light sensing position at which the next field starts. A circuit responsive to the concurrent presence of both stored signals produces an output pulse which may be employed to signal the computer associated with the light probe.

INVENTOR.
ROBERT JOHN CLARK
BY H. Christoffersen
Attorney

LIGHT PROBE CIRCUIT FOR PERSISTENT SCREEN DISPLAY SYSTEM

BACKGROUND OF THE INVENTION

The function of a light "pen" or "probe" is to provide a data display terminal operator with a simple means for accessing the central processor or bulk storage device of a digital computer. The light probe is a hand-held device which includes light sensing means. It is held next to the screen of a cathode-ray tube display and when it senses light emitted from the small region of the phosphor next to the point of the probe, it sends a signal to the computer, generally requesting some change in the information being displayed.

The operator of the data display terminal sits relatively close to the display device, for example, 18 inches. The display device, therefore, must be relatively flicker-free to present a picture which does not cause the operator eye strain. This requires the use of a cathode-ray tube having a high persistence phosphor.

When the operator uses the light probe, for example, to direct the computer to display a page of information called for by one particular character of a plurality of "index" characters being displayed, errors sometimes occur. The electron beam may, for example, be writing a character other than the one pointed at by the probe but, due to the high persistence of the cathode-ray tube screen, sufficient light may still be present to actuate the light probe. Thus, it may appear to the computer that the light probe user is asking for a page of information corresponding, for example, to the letter "g" when in fact the probe is pointing at "b". As a result, the computer causes the wrong information to be extracted from its memory and the wrong page of information to be displayed.

It is the object of this invention to provide a system employing a light probe which permits the use of a display having a persistent screen.

BRIEF SUMMARY OF THE INVENTION

A system having a display device with a persistent screen and a light probe which is activated when the area of the screen at which it is pointing produces light at greater than a given intensity, and in which the screen has sufficient persistence that an area energized during one field time continues to produce light at a level greater than said given intensity for not more than one additional field time. The system has means responsive to the sensing of light by the light probe during two successive field times, after the light probe has been placed in its light sensing position, for producing an output signal. There are also means responsive to the sensing of light by the light probe during less than two successive field times, after the light probe has been placed in the light sensing position, for preventing the production of the output signal.

DETAILED DESCRIPTION

For purposes of the present invention, the light probe logic circuit which embodies the invention is described as operating with the information retrieval and display system of application Ser. No. 667,543, filed Sept. 13, 1967 by the present inventor and assigned to the same assignee as this application. It is to be understood, however, that this use is merely illustrative as the invention is equally suitable for use in many other applications.

Figure 1:
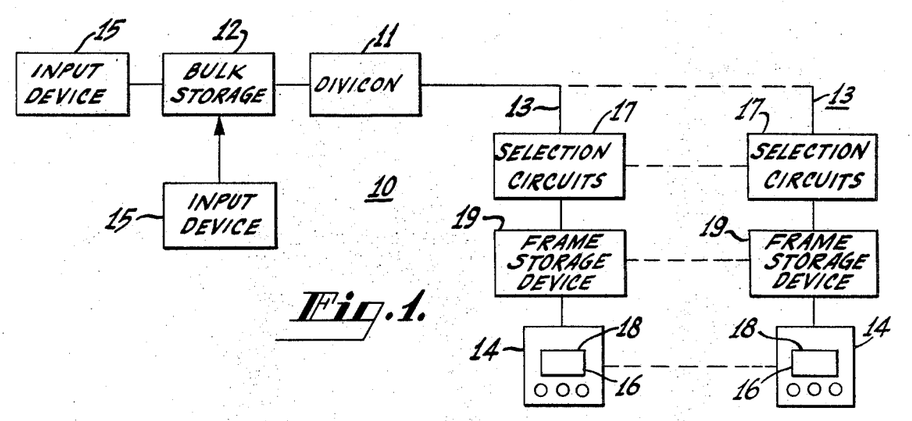
FIG. 1 is an overall block diagram of a display system which may embody the invention.

FIG. 1 is an overall block diagram of the information retrieval and display system 10 of the aforementioned reference, that retrieves informational data stored in a bulk storage device 12 and transmits the data to any of a plurality of display networks 13. Each display network 13 includes one display device 14 for displaying the date. The bulk storage device 12 may, for example, comprise a magnetic storage system such as a magnetic core memory, magnetic drum of a magnetic disc. A plurality of input devices 15, such as keyboards, insert the informational data in the storage device 12 to be stored therein. The keyboard entries to the storage device 12 are in the form of binary characters. The display devices 14 include conventional television picture tubes 16 for displaying the characters. In order to display the informational data stored in binary character form in the storage device 12 on a television picture tube 16, it is necessary to convert the binary characters into corresponding video signals in a digital-to-video converter (DIVCON) unit 11. The converter unit 11 decodes the binary characters from the storage device 12 and produces the selective blank and unblank signals necessary to display the characters, such as shown in part in FIG. 2, on the faces 18 of the picture tubes 16.

Conventional television picture tubes exhibit a frame of pictorial images each 1/30 of a second to provide 30 frames per second. Each frame of images is composed of two interlaced fields of scan lines and each field corresponds to a complete scanning of the face 18 of a picture tube 16 from top to bottom. The data to be displayed is, therefore, organized in the storage device 12 in blocks of data arranged to correspond to frames of video signals when converted to video signals in the converter unit 11.

Each successive block of data is converted into a frame of video signals and the fields comprising the frames are transmitted in series to the plurality of display networks 13. Each user or viewer selects a desired frame by actuating selection circuits 17 to extract the desired frame from the other serially occurring frames. One of the serially occurring frames is a master index by means of which, and with the aid of a light probe, any one of the other frames of stored video may be selected.

The selection circuit 17 includes the light probe logic circuitry. The selection is accomplished by incorporating a frame address in each field of video and actuating the selection circuits 17 when the desired frame arrives. For example, a frame address may provide the field video data signals and appear at the top margin of each field. Alternatively, the frame address may be located in one of the first 18 scan lines in a field. These scan lines are not usable for transmitting video data signals since they are generated during the vertical retrace interval occurring between the end of one field and the beginning of the next field. The advantage of utilizing one of these scan lines for this purpose is that the frame address is not displayed on the face 18 of the picture tube 16.

A frame that is actually selected for viewing in any display network 13 is stored in frame storage device 19 for the network and is periodically read out for display on the picture tube 16 of the network. The frame storage device 19 effectively provides each television picture tube 16 with a refresh memory and thereby permits a single frame of informational data to be viewed as if the frame were stationary. The frame storage device 19 may comprise a recirculating delay line, a recirculating shift register or any other storage device capable of being read out cyclically. A preferred form of storage device 19 is a nondestructive read-out charge storage tube. Such a tube may be scanned in unison with the television picture tube 16, thereby simplifying read-out. Furthermore, analog information such as graphical or pictorial data may readily be stored in such a tube.

It is to be noted that any viewer in any of the display networks 13 may select any frame desired and two or more viewers may view the same or different frames.

Figure 2:
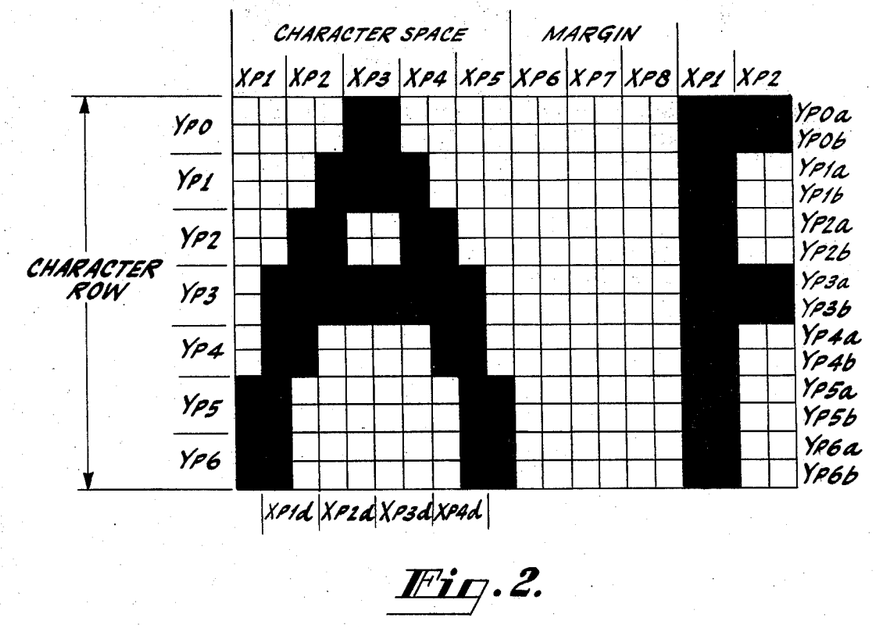
FIG. 2 is a graphical illustration of the formation of individual characters and the manner in which they may be displayed on the display device.

FIG. 2 shows the manner in which character patterns may be formed and displayed on a display device, such as a conventional picture tube. In such a tube, the scanning beam that generates the display traverses the face of the tube from left to right and from top to bottom. Each character pattern is composed of a plurality of contiguous dots that are produced by the selective blanking and unblanking of the scanning beam as the beam laterally traverses the display device.

In the television picture tube itself, the dots are, of course, white with the background dark, whereas the dots are shown dark on a white background in FIG. 2 for illustrative purposes. A character such as character A may, for example, be five-dot spaces wide, regions XP1 through XP5, and may be spaced by a margin of three dot spaces, regions XP6 through XP8, from the next character.

Figure 3:
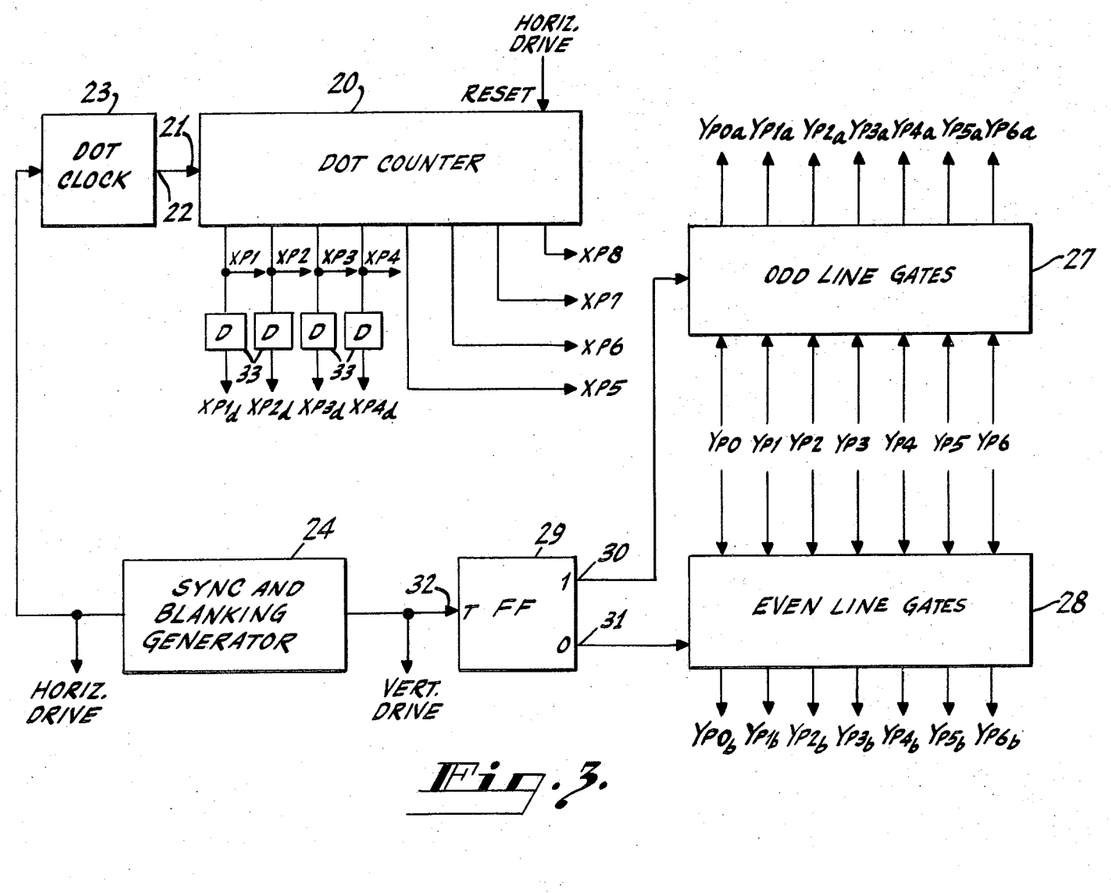
FIG. 3 is a logic diagram useful in the understanding of the basic timing of the system.

The dot spaces, regions XP1 through XP8, correspond in duration to dot signals XP1 through XP8, respectively, which are generated by a dot counter 20, FIG. 3. The dot signal XP6 may be termed an end-of-character pulse and the dot signal XP8 may be termed the start-of-character pulse. The input terminal 21 of the dot counter 20 is connected to an output terminal 22 of a dot clock 23. The dot clock 23 has a pulse repetition rate of 5.12 pulses per microsecond, which produces a scan line having a useful duration of 50 microseconds. This produces 32 character space regions per scan line. The dot clock 23 is synchronized with a sync and blanking generator 24 by means of a horizontal drive pulse. The horizontal drive pulse also resets the dot counter 20. The dot counter, dot clock, and sync and blanking generator are part of the DIVCON unit 11 (FIG. 1).

Each character may also be seven scan lines in height, region YP0 through YP6, (FIG 2). In an interlaced system, the height is formed by two pairs of interlaced scan lines, as shown by the scan lines labeled YP0a through YP6a and YP0b through YP6b, respectively, (FIG. 1). Hence, the two interlaced scan lines YP0a and YP0b are equal in height to one noninterlaced scan line YP0, etc. The alphabetic notations $a$ and $b$ are appended to the scan line designations to denote, respectively, the odd and even interlaced fields of scan lines. A field of scan lines in an interlace system is a single scan of a display device and two interlaced fields of such scan lines comprise a frame.

Figure 4:
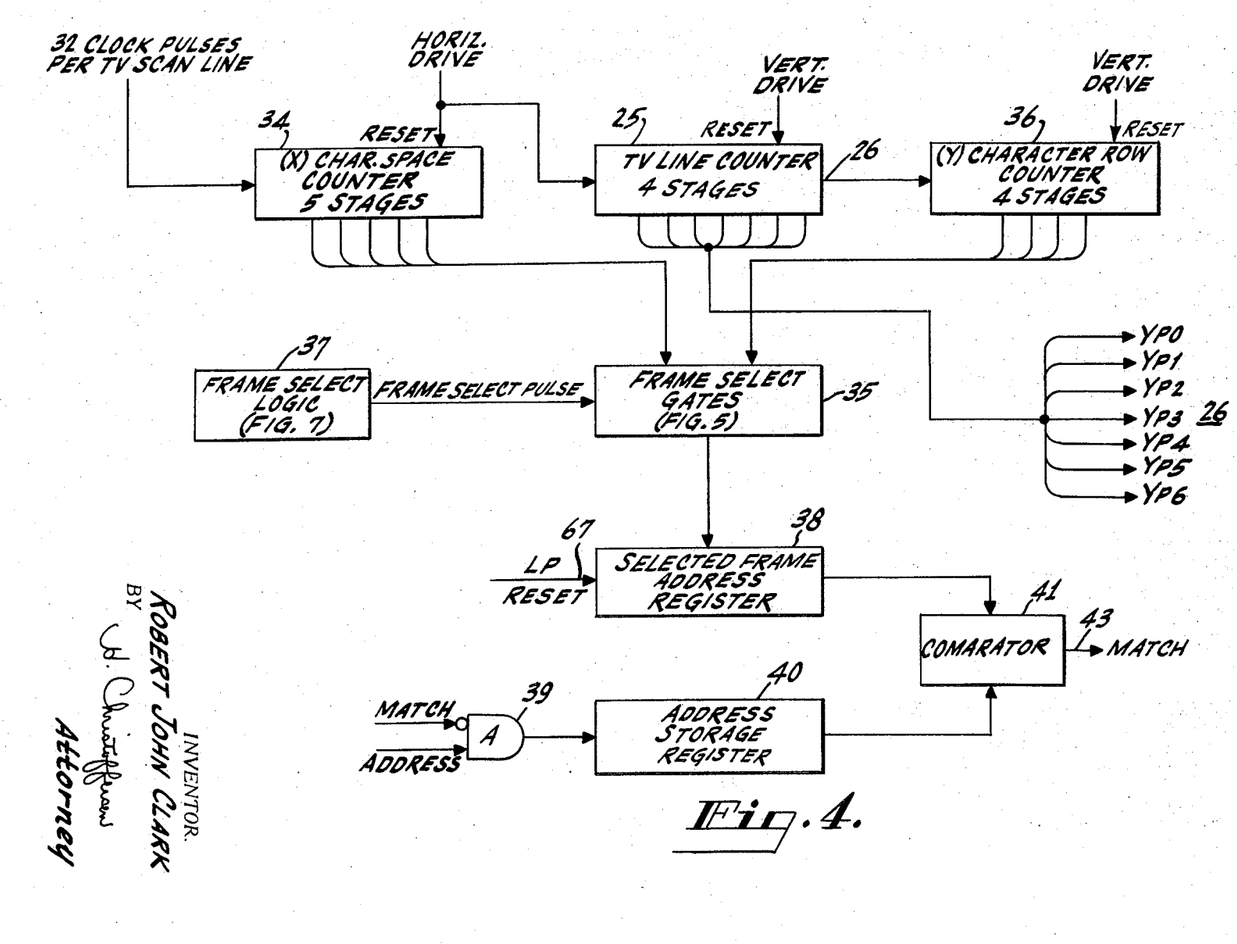
FIG. 4 is a logic diagram of a system which may employ the frame selection process of the invention.

The height regions YP0—YP6 (FIG. 2) correspond in duration to line signals YP0—YP6 which are generated by a television (TV) line counter 25 (FIG. 4). The counter 25 which comprises four stages counts horizontal drive pulses. There are 262 horizontal drive pulses per frame of video. There is, therefore, at the output terminal 26 of the counter 25, one pulse for every 16 input pulses, that is, one pulse each 16 scan lines. The line counter 25 generates the line signals 26, YP0—YP6 denoting the scan line positions, corresponding respectively to counts 1—7, as well as scan line signals denoting positions or margins between character rows. There may be, for example, 16 character rows formed, each row containing 32 characters.

The odd and even interlaced scan lines YP0a—YP6a and and YP0b—YP6b are generated by odd and even line gates 27 and 28, respectively, (FIG. 3). These gates, for example, may be AND gates. The input signals to the odd line gates are the line signals YP0—YP6 and the output signal from the 1 terminal 30 of a flip-flop 29. The input signals to the even line gates are the line signals YP0—YP6 and the output signal from the 0 terminal of the flip-flop 29. The input terminal 32 of the flip-flop 29 is connected to the generator 24 which applies the vertical drive pulse to the input terminal 32. The flip-flop 29, therefore, changes state every field period, whereby the odd line gates 27 are enabled during the odd field times and the even line gates 28 are enabled during the even field times. The gates 27 and 28 and the flip-flop 29 are part of the DIVCON unit 11 (FIG. 2).

Each character pattern is formed in a character space array by selectively blanking and unblanking the scanning beam in each scan line. The retentivity of vision of the human eye is relied upon to build up the impression of completely static characters from the separate character slices that are produced each scan line, similar to the manner in which a picture is built up in television. To form the character A (FIG. 2), the scanning beam in the first odd interlaced scan line YP0a is blanked during the dot spaces, regions XP1, XP2; unblanked during the dot space, region XP3; and then blanked again during the dot spaces, regions XP4 and XP5. During the remaining scan lines, similar blanking and unblanking occurs until the entire character pattern is formed. To form characters which are more pleasing to the eye, the dot signals XP1 through XP4 are delayed in delay circuits 33 (FIG. 3) to form delayed dot signals XP1d through XP4d. The delayed dot spaces, regions XP1d—XP4d (FIG. 2), correspond in duration to the delayed dot signals XP1d—XP4d. The delayed dot signals may be utilized to bridge over the dot signals XP1—XP5 to prevent any gaps from appearing between dot spaces.

The number of character rows and character spaces is a design choice made on the basis of the size and number of characters desired.

Figure 7:
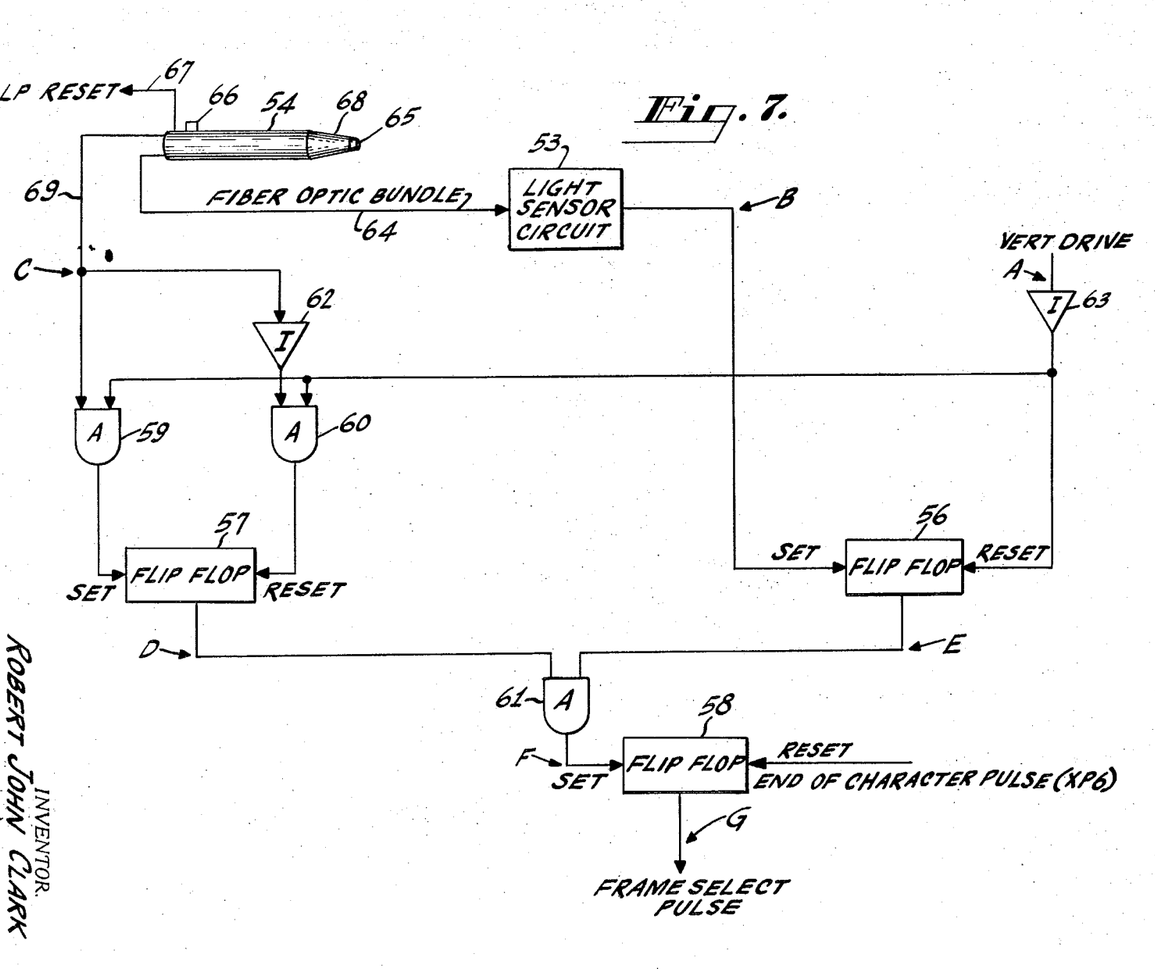
FIG. 7 is a frame select logic circuit which embodies the invention.

FIG. 4 illustrates portions of the DIVCON unit 11 and the selection circuits 17 which function to select the frame of video to be displayed on the face of the display device 14 (FIG. 1). A character space counter 34 is connected to a plurality of frame select gates 21 which are shown in greater detail in FIG. 5. The TV line counter 25 is connected to the odd and even line gates 27 and 28 (FIG. 3) and to a character row counter 36, which is connected to the frame select gates 35. A frame select logic network 37, which embodies the invention and is shown in greater detail in FIG. 7, is connected to the gates 35, which in turn are connected to a selected frame address register 38. The system also includes an AND gate 39 which is connected to an address storage register 40. The selected frame address register 38 and the address storage register 40 are connected to a comparator 41.

The character space counter 34 comprises a 5-stage counter which counts 32 clock pulses per TV scan line. These clock pulses, for example, may be XP8 pulses, which were earlier termed as start-of-character pulses. The space counter 34 is reset by a horizontal drive pulse which originates in the sync and blanking generator 24 (FIG. 3). There are, therefore, 32 separate counts generated, each of which is indicative of one of the 32 character spaces per TV line. The horizontal drive pulses are connected to the input terminal of the TV line counter 25 which comprises four stages. The counter 25, as was explained earlier, counts the horizontal drive pulses, the first seven counts of the counter generating the line signals YP0—YP6. There is, therefore, at the output terminal 26 of the counter 25, one pulse for every 16 input pulses, that is one pulse each 16 scan lines. The counter 25 is reset at the end of each field period by the vertical drive pulse which is generated by the sync and blanking generator 24 (FIG. 3).

The pulses produced by the counter 25 are applied to the input terminal of the character row counter 36 which comprises four stages. Accordingly, counter 36 counts from 1 to 16 and is reset by the above-mentioned vertical drive pulse. Each count, therefore, is indicative of one of the 16 character rows generated per field.

The output lines of the character space counter 34 and the character row counter 36 are connected in parallel to the input terminals of frame select gates 35. The signals on these lines (five from 34 and four from 36) comprise a 9-bit word which is indicative of the address, row and character space on the screen of a display. This address is indicative of a frame of video which is stored in the bulk storage device 12 (FIG. 1). For example, refer to FIG. 1, the character A is indicative of the address of one frame of video and the character F is indicative of the address of another frame of video. A frame select pulse, which is generated by the frame select logic circuit 37 is also applied to the frame select gates 35.

Figure 5:
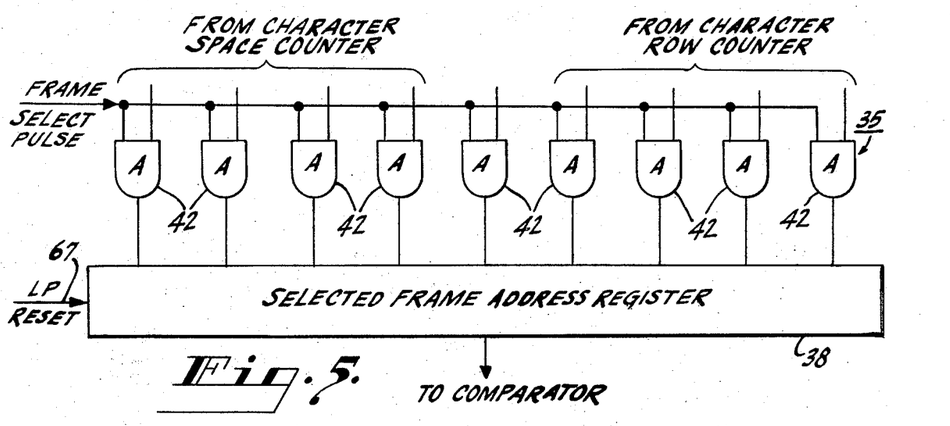
FIG. 5 is a detailed logic diagram of the frame select gates shown in FIG. 4.

Referring briefly to FIG. 5, it may be seen that the plurality of AND gates 42 which comprise the frame select gates 35 are primed in response to a frame select pulse representing binary 1. The gates 42 each receive also a second signal from the character space counter 34 or the character counter row counter 36. When both signals applied to a gate 42 represent binary 1, the gate becomes enabled. The convention is adopted that a relatively positive signal represents a binary 1 and a relatively negative signal represents a binary 0.

Assume that the master index frame of video is displayed and the viewer wishes to view the frame of video having the address indicative of the character F. The 9-bit word for the character F is 000010000, which is the space-row position of the character F (FIG. 1). If a viewer wishes to view the frame of video which has this particular address, the frame select logic circuit 37 (FIG. 4) generates a binary 1 signal, as will subsequently be explained, which enables the AND gates 42, which are primed, thereby applying the 9-bit word 000010000, in parallel, to the selected frame address register 38. The register 38 stores this particular address until reset by the light probe (LP) pulse, as will subsequently be explained. This address is then applied to the comparator circuit 41 (FIG. 4).

Returning to FIG. 4, a match signal is generated at the output terminal 43 of the comparator 41. This signal is a binary 1 when the addresses in the respective registers 38 and 40 are the same and is a binary 0 when the address in register 40 is not the same as the address in register 41. The match signal is applied to a first input terminal of the AND gate 39, priming the gate when the match signal is a binary 0. Applied to the second input terminal of the AND gate 39 are the serially arriving addresses of the stored frames of video from the DIVCON unit 11 (FIG. 1). As was explained earlier, the frame address may be located in one of the first 18 scan lines in a field. Since two fields comprise a frame of video, there is one frame time between each different address arriving at the second input terminal of the AND gate 39. When the addresses stored in registers 38 and 40 correspond, the comparator generates the match signal, which is a binary 1. This signal then disables the AND gate 39 causing address storage register 40 to retain the last stored address maintaining the match signal at a binary 1 level.

Figure 6:
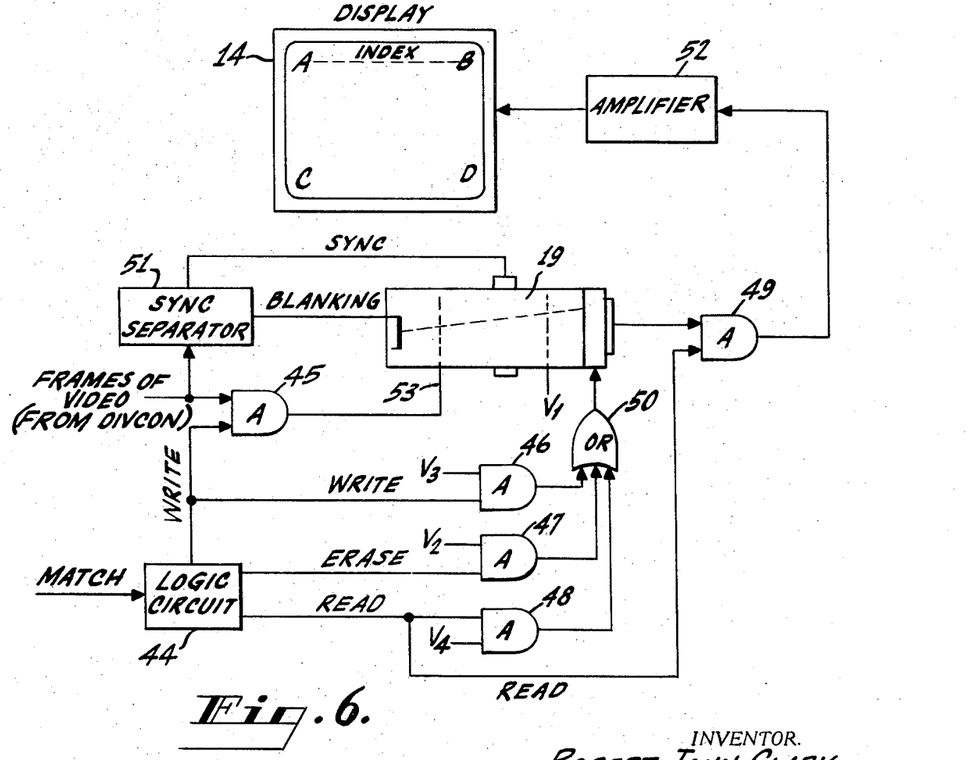
FIG. 6 is a diagram illustrating how a frame of selected video may be processed for display on the display device.

Referring now to FIG. 6, one of the display devices 14, the frame storage device 19 and pertinent portions of the selection circuits 17 are illustrated. There is a logic circuit 44, first, second, third, fourth and fifth AND gates 45, 46, 47, 48 and 49, respectively, an OR gate 50, sync separator 51, and an amplifier circuit 52.

The sync separator 51 is synchronized with the synchronization systems of both the DIVCON unit 11 and the display device 14, whereby the video signals stored in the storage device 19 are read out in proper time sequence for display on the display device 14, as the sync separator provides sync and blanking signals for the storage device 19. Frames of video signals, each frame comprising two fields, are applied to the sync separator 51 and to a first input terminal of the AND gate 45. Applied to the second input terminal of the AND gate 45 is a "write" signal from the logic circuit 44. The match signal, which was previously described, is applied to an input terminal of the logic circuit 44, whereby the logic circuit 44 successively generates an "erase," a "write," and a "read" signal in response to the match signal being a binary 1. The logic circuit 44 is described in detail in the aforementioned referenced application, and corresponds to the flip-flop 94, OR gate 114, AND gate 116, and counter 118 illustrated at FIG. 3(b) of the referenced application.

Assuming the match signal is a binary 1, the logic circuit first generates an "erase" signal, which is a binary 1, and which is applied to a first input terminal of the AND gate 47. Applied to the second input terminal of the gate 47 is a voltage V2 which is of a level required for erasing the video information which was stored in the frame storage device 19. The output signal from gate 47 is at a level V2 and is applied to a first input terminal of the OR gate 50. The output signal from the gate 50 is at a level V2 and is applied to the storage device 19. It requires two interlaced fields of scan lines to be generated to complete the erase cycle, since the storage device 19 scans in synchronism with the display device 14. It may be seen, therefore, that the address of the frame of video which is to be written on the storage device 19 must be contained in the preceding frame of video. For example, if the frame of video which has the address corresponding to the character F (FIG. 1) is selected for viewing, the address for F must be contained in the frame of video for the character A (FIG. 1). It may be seen, therefore, that the frame of video, two fields, which is indicative of A is arriving serially at the input terminal of the sync separator and the first input terminal of the AND gate 45 at the same time the match signal is a binary 1 in response to the address corresponding to F being stored in the registers 38 and 40 (FIG. 4). Therefore, during the time interval the erase cycle is being generated, the frame of video corresponding to the address for character A is arriving serially at a first input terminal of the gate 45. This gate, however, is disabled since the write signal at the second input terminal is a binary 0. At the end of these two field periods, the "write" signal is then generated by the logic circuit 44, as the frame of video, two fields, which is indicative of F is arriving serially at the first input terminal of the gate 45, whereby the two fields of video comprising the frame indicative of the F are applied to the control grid 53 of the storage device 19. Accordingly, the erase signal returns to a binary 0 disabling gate 47. Concurrently, the write signal, which is now a binary 1 is applied to a first input terminal of the AND gate 46. Applied to a second input terminal of the gate 46 is a voltage V3 which is of a level required to write into the storage device 19. The output signal which is now at a level V3 is then applied via OR gate 50 to the storage device 19. The "write" cycle requires two field times to complete since it requires two interlaced scan periods to generate a frame of video. The "write" cycle is completed, therefore, at the same time the frame of video indicative of F has passed through gate 45. The "write" signal then returns to binary 0 disabling gate 45, whereby succeeding frames of video may not be written into the storage device 19. The logic circuit 44 then generates a "read" signal which is at a binary 1 level and which is concurrently applied to first input terminals of AND gates 48 and 49, respectively. Applied to the second input terminal of the gate 48 is a voltage V4 which is of a level required to read from the storage device 19. The output signal from gate 48 is applied via OR gate 50 to storage device 19 to initiate the read cycle. Applied to the second input terminal of the AND gate 49 is the output signal from the storage device 19, which in this instance is the frame of video indicative of F. The output signal from gate 49, therefore, is this frame of video and is applied to the input terminal of the amplifier circuit 52 and in turn is applied to the deflection circuits of display device 14, whereby the frame of video may be displayed.

Figure 8:
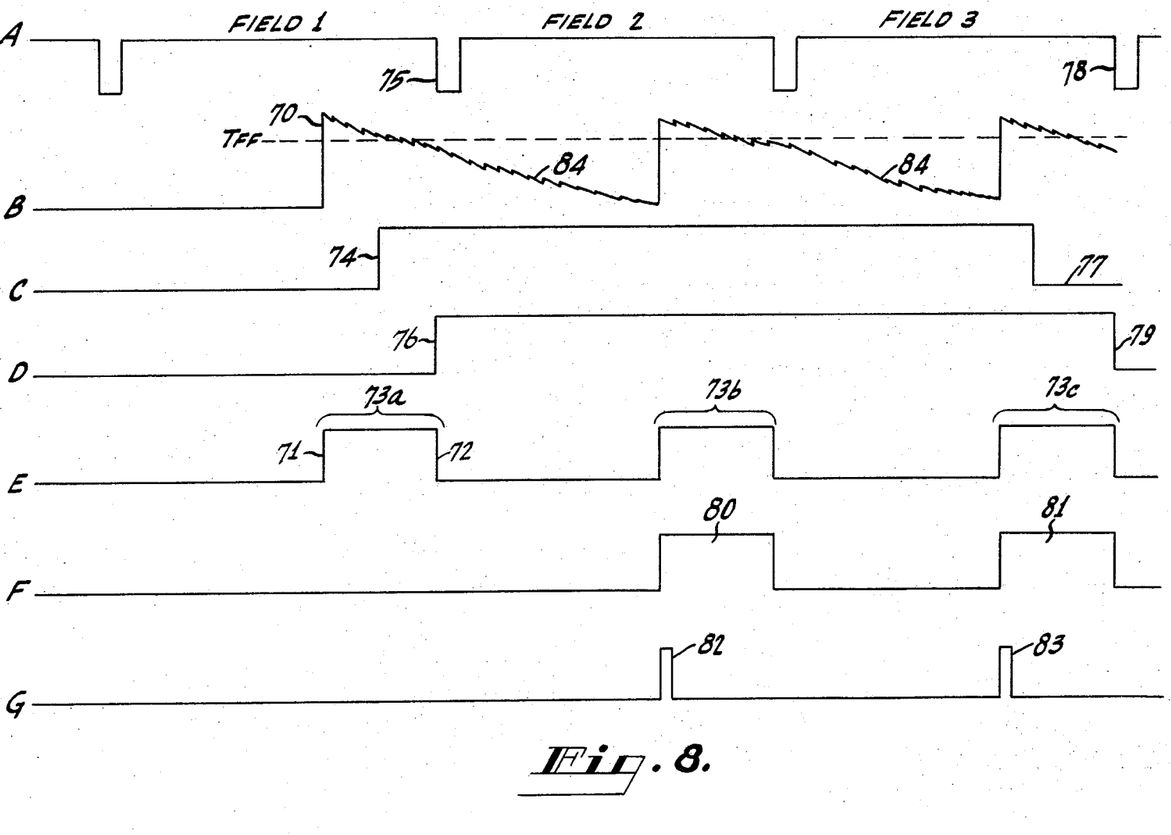
FIG. 8 is a group of waveforms which are helpful in understanding the operation of the logic circuit of FIG. 7.

FIG. 7 illustrates the system for selecting the frame of video information to be displayed. FIG. 8 illustrates the waveshapes obtained in the circuit of FIG. 7. There is a light "probe" or "-pen" 54, a light sensor circuit 55, and first, second, and third storage devices, such as flip-flops 56, 57 and 58, respectively, which may be of the J/K variety. Also included are first, second and third AND gates 59, 60 and 61, respectively, and inverters 62 and 63, respectively. The light "probe" 54 includes a fiber optic bundle 64 which has one end connected in the light sensing end 65 of the probe 54 and the other end thereof connected to the input terminal of the light sensor circuit 53. A switch 66 may be mounted on the end opposite the light sensing end of the probe 54. The closing of this switch generates a light probe (LP) reset pulse which is applied via line 67 to the reset terminal of the selected frame address register 38 (FIGS. 4 and 5).

The LP reset pulse stores the master index frame address in the register 38. For example, the register may be reset so that the 9-bit word is all zeros, the address of the master index frame. Therefore, when the 9-bit word comprising all zeros is stored in the address storage register 40 (FIG. 4) the comparator 41 (FIG. 4) generates a match signal binary 1 initiating the "erase," "write" and "read" cycles for the storage device 19 (FIG. 6), whereby the master index frame of video is displayed on the face of the display device 14.

A pressure sensitive switch 68 is housed in the light sensing end of the probe 54. The positioning of the light probe in its light sensing position, that is, the pressing of the probe against the face of the display, closes the switch 68, and the closing of the switch causes a voltage level indicative of binary 1 to be applied to line 69. Removal of the light probe from the light sensing position opens the switch and the voltage level on line 69 returns to its quiescent value representing binary 0. The voltage level generated by the switch is applied via line 69 concurrently to a first input terminal of the AND gate 59 and the input terminal of the inverter 62.

Consider the situation when the master index is displayed on the face of display device 14, as is illustrated at FIG. 6. If the viewer wishes to view the frame of video which has the address corresponding to the character D, the light probe is placed in a light sensing position and pressed on the face of the display directly over D.

Returning to FIG. 7, the fiber optic bundle in the light sensing end 65 of the probe 54 responds to light from the character D an instant of time prior to the pressure sensitive switch being pressed on the face of the display 14. This is due to the finite amount of time required by the operator to place the probe in a light sensing position.

The response of the fiber optic bundle energizes the light sensor circuit 53 which generates the waveshape illustrated at B (FIG. 8). The light sensor circuit may, for example, comprise a photodiode or light-sensitive field effect transistor and amplifier. The leading edge 70 of the waveshape B, when reaching the threshold level ($T_{FF}$) of the flip-flop, sets the flip-flop 56 to the 1 state. This is illustrated at 71 at waveshape E. A short time later, flip-flop 56 is reset (72 at waveshape E) by the inverted vertical drive pulse 75 (waveshape A). Thus, once each field interval during which light is sensed, the flip-flop 56 is first set and then reset, thereby storing a first signal between the time light is sensed and the end of the field time in which the light is sensed. These are the time intervals 73a, 73b, and 73c, waveshape E.

The voltage level generated in response to the closing of switch 68 when the probe 54 is placed in its light sensing position, is illustrated at 74 of waveshape C. This level is applied to the first input terminal of the AND gate 59 (FIG. 7) priming this gate. This level is also applied to the input terminal of inverter 62, and the latter produces a 0 which disables the AND gate 60. The next vertical drive pulse 75 enables the AND gate 59 producing a pulse at the output terminal thereof representing a 1 which sets the flip-flop 57 to the 1 state, as illustrated at 76 of waveshape D. The removal of the probe 54 from the light sensing position opens the switch 68 producing a direct current level 77 representing a 0, as illustrated at waveshape C. This level disables AND gate 59, and inverter 62 generates a 1 at its output terminal priming AND gate 60. The next vertical drive pulse 78, waveshape A, enables AND gate 60, which generates a pulse to reset flip-flop 57 at time 79, waveshape D. In summary, in response to the closing of switch 68, flip-flop 57 stores a signal for at least one field time, and it starts storing this signal in response to the first vertical retrace pulse which occurs after the switch is closed.

During the period 76 to 79, when flip-flop 57 is set, flip-flop 56 is also set (times 73b and 73c). When both flip-flops are set, AND gate 61 becomes enabled producing the outputs 80 and 81, waveshape F, the leading edges of which set flip-flop 58 to the 1 state. The flip-flop 58 is reset at times 82 and 83 by the next occurring end-of-character pulse XP6, which was described earlier. In this instance, the end-of-character pulse XP6 which resets the flip-flop 58 is the XP6 pulse occurring immediately after the character D. The end-of-character pulses, XP6, are not illustrated in FIG. 8 because of their short duration and number. The pulse appearing at the output terminal of the flip-flop 58 is termed the frame select pulse. As was explained earlier, the frame select pulse is applied to the frame select gates (FIGS. 4 and 5) thereby enabling these gates to store the selected frame address in the register 38 (FIG. 4). For the situation just described, the address indicative of the character D is stored in the register 40. The match signal then initiates the cycles of erasing the master index frame of video from the storage device 19 (FIG. 6), writing the frame of video for address D into storage device 19, and then reading the frame of video for address D onto the face of display device 14 (FIG. 6).

Returning to FIG. 8, if, for example, during field 1 the light probe was placed over character D as the raster was scanning character A (FIG. 6), it is possible, in prior art light probe circuits, to generate a frame select pulse for A when pointing at D. This is due to a decaying level of light 84, caused by the persistence of the phosphor on the screen. The generation of an incorrect frame select pulse is not possible in the circuit just described, since the first time light is sensed, it is ignored until at least one field time later insuring it is a valid signal. This is illustrated at waveshape E. Frame select pulses 82 and 83 are generated during field times 2 and 3, whereas light was first sensed in field 1.

I claim:

1. In a system having a cathode ray tube and a light probe which is activated when the area of the screen at which it is pointing produces light at greater than a given intensity, and in which the screen has sufficient persistence that an area energized by the electron beam continues to produce light at a level greater than said given intensity for not more than one field time, the improvement comprising, in combination:

means responsive to the sensing of light by said light probe during each field time for storing a first signal only for the interval, during each field time, between the time light is sensed and the end of the field time;

means responsive to the placing of said light probe in its light sensing position for storing a second signal having a duration at least equal to one field time and starting at the time, after the probe is placed in said position, at which the next field starts; and means responsive to the concurrent presence of said two stored signals for generating an output signal.

2. In a system having a display with a persistent screen and a light probe which is activated when the area of the screen at which it is pointing produces light at greater than a given intensity, and in which the screen has sufficient persistence that an area energized during one field time continues to produce light at a level greater than said given intensity for not more than one additional field time, the improvement comprising, in combination:

means responsive to the sensing of light by said light probe during each field time for storing a first signal only for a fraction of each field time, starting at the time light is sensed;

means responsive to the placing of said light probe in its light sensing position for storing a second signal having a duration of at least one field time and starting at the time, after the probe is placed in said position, at which the next field starts; and means responsive to the concurrent presence of said two stored signals for generating an output signal.

3. The combination claimed in claim 2, said means responsive to the sensing of light comprising a flip-flop which is set in response to the sensing of light and which is reset at the end of the field time in which the light is sensed.

4. The combination claimed in claim 2, said means responsive to the placing of said light probe in its light sensing position comprising a flip-flop which is set at the next field time after the probe is placed in the light sensing position and is reset no sooner than one field time later.

5. The combination claimed in claim 2, said means responsive to the concurrent presence of said two stored signals comprising an AND gate.

6. In a system having a display with a persistent screen and a light probe which is activated when the area of the screen at which it is pointing produces light at greater than a given intensity, and in which the screen has sufficient persistence that an area energized during one field time continues to produce light at a level greater than said given intensity for not more than one additional field time, the improvement comprising, in combination:

means responsive to the sensing of light by said light probe during two successive field times, after the light probe has been placed in its light sensing position, for producing an output signal; and means responsive to the sensing of light by said light probe during less than two successive field times, after the light probe has been placed in said light sensing position, for preventing the production of said output signal.

7. The combination claimed in claim 6, including means responsive to said output signal for signalling said system to display a selected frame of video on said display.

8. An information display system comprising in combination;

a persistent screen;

means for displaying on said screen a page of index characters and for refreshing the displayed characters at a rate sufficient to cause each character to remain visible during the intervals between which it is refreshed;

means including a light pen for causing to be displayed on said screen in response to the receipt by the light pen of light from one of said characters, at the time said character is being refreshed, a frame of information called for by said character; and means for preventing the last-named means from displaying such a frame of information in response to the receipt by the light pen of light from one of said characters at a time other than when it is being refreshed.